(12) United States Patent
Wiggs et al.

(10) Patent No.: US 10,103,966 B2
(45) Date of Patent: Oct. 16, 2018

(54) ANALYSIS AND DIAGNOSIS OF CONNECTIVITY IN A MULTI-DEVICE NETWORK

(71) Applicant: NETMOTION WIRELESS, INC., Seattle, WA (US)

(72) Inventors: Jonathan Wiggs, Seattle, WA (US); Eric Bott, Seattle, WA (US)

(73) Assignee: NETMOTION WIRELESS, INC., Seattle, WA (US)

(*) Notice: Subject to any disclaimer, the term of this patent is extended or adjusted under 35 U.S.C. 154(b) by 467 days.

(21) Appl. No.: 14/790,865

(22) Filed: Jul. 2, 2015

(65) Prior Publication Data

US 2016/0006641 A1 Jan. 7, 2016

Related U.S. Application Data

(60) Provisional application No. 62/020,693, filed on Jul. 3, 2014.

(51) Int. Cl.
| | |
|---|---|
| *G06F 15/16* | (2006.01) |
| *H04L 12/26* | (2006.01) |
| *H04L 12/24* | (2006.01) |
| *H04L 12/70* | (2013.01) |

(52) U.S. Cl.
CPC .......... *H04L 43/50* (2013.01); *H04L 41/0853* (2013.01); *H04L 43/0811* (2013.01); *H04L 43/0817* (2013.01); *H04L 43/0864* (2013.01); *H04L 43/10* (2013.01); *H04L 2012/5628* (2013.01)

(58) Field of Classification Search
CPC .. H04L 41/0654–41/0695; H04L 45/28; H04L 69/40; H04L 2012/5625–2012/5629; H04L 43/00; H04L 43/10; H04L 43/16–43/18; H04L 43/50; H04W 8/30
See application file for complete search history.

(56) References Cited

U.S. PATENT DOCUMENTS

| | | | |
|---|---|---|---|
| 6,662,217 B1* | 12/2003 | Godfrey | H04L 43/50 709/203 |
| 9,397,922 B1* | 7/2016 | Collins | H04L 43/50 |
| 2005/0105524 A1* | 5/2005 | Stevens | H04L 45/04 370/389 |
| 2006/0143299 A1* | 6/2006 | Jones | H04L 12/5692 709/227 |
| 2007/0019670 A1* | 1/2007 | Falardeau | H04W 48/18 370/465 |
| 2007/0130429 A1* | 6/2007 | Cunningham | H04L 12/4641 711/147 |

(Continued)

*Primary Examiner* — Brendan Higa
(74) *Attorney, Agent, or Firm* — Greenblum & Bernstein, P.L.C.

(57) ABSTRACT

System and method for diagnosing the state of a device connected to one or more computer networks. The method can include gathering and analyzing a status and configuration of every computer network interface available on a device, gathering and analyzing the network configuration information on a device, and, if available, gathering of GPS configurations, status, and data. The method can also include testing of network connectivity for the device using a preset server as a control and the testing of network connectivity for the device to arbitrary networked resources.

20 Claims, 4 Drawing Sheets

(56) References Cited

U.S. PATENT DOCUMENTS

| | | | |
|---|---|---|---|
| 2009/0049122 A1* | 2/2009 | Wayne | G06F 17/30 709/203 |
| 2012/0140641 A1* | 6/2012 | Reese | H04L 43/12 370/245 |
| 2014/0011478 A1* | 1/2014 | Collins | H04L 43/00 455/411 |

* cited by examiner

ANALYSIS AND DIAGNOSIS OF CONNECTIVITY IN A MULTI-DEVICE NETWORK

CROSS-REFERENCE TO RELATED APPLICATIONS

The present application is a Non-provisional application claiming the benefit under 35 U.S.C. § 119(e) of U.S. Provisional Application No. 62/020,693 filed Jul. 3, 2014, the disclosure of which is expressly incorporated by reference herein in its entirety.

BACKGROUND OF THE INVENTION

1. Field of the Invention

A system and method for diagnosing, reporting, aggregating, and analyzing the connectivity and potential issues occurring in a multi-device network.

2. Discussion of Background Information

In a modern system of networked devices, especially in networks utilizing wireless communication, multiple issues can hamper optimal functioning. The typical user of a device is only aware of the system's degradation or malfunction and is not equipped to analyze or remediate issues.

The administrator of a modern networked system, who is equipped to analyze and remediate issues, is rarely present when users are affected. This problem is compounded in multi-device systems where administrators are vastly outnumbered by end-users. In addition, system degradations and malfunctions can be subtle and intermittent, which can result in prolonged and often unsuccessful analysis.

SUMMARY OF THE EMBODIMENTS

In the course of development, it was determined that many of the aims could be accomplished by creating a system and method based around running diagnostic tests on the networked devices instead of collecting vast amounts of arbitrary data. In addition, the scope of the diagnostic tests could be controlled, which enabled a much more tractable analysis and one squarely within the expertise of the development team.

Embodiments are directed to a system and method that include the execution of a series of known and customized tests on a networked device; the initiation of said tests by the device's user or automatically due to conditions on the device; the initial analysis of the results by the device; the retention and transmittal of the results and associated analysis to a server; retention, aggregation, and display on the server; aggregate analysis, possibly using device locations, of multiple results by the server; and display and notifications of findings.

According to embodiments, a system and method is producing "probable root cause" and a "most pertinent issue" from an analysis for each test run. In embodiments, via a centralization of the results to a server, results can be manipulatable at the server to discover emergent issues and trends.

Embodiments of the present invention are directed to a system and method for automatic or user-initiated execution of a series of tests whose results are analyzed by the affected device, summarized for the device's user, and sent to a server for further analysis by the system's administrator. The server can also perform aggregate analysis of multiple device results and notify the administrator of emergent or significant issues.

The end user of today's sophisticated networks, especially wireless networks, is typically only able to troubleshoot a small number of issues and does not normally embody the knowhow necessary to get at the more esoteric and intermittent problems that can occur during normal usage. The present invention provides a simple interface to the end user, e.g., a single button, which can be pressed to initiate diagnosis and analysis of their devices current conditions. The device presents its findings at three levels of increasing complexity. First, the device can call out a "probable root cause" and provides a straightforward description. Second, the device can summarize the results for each test run. Finally, the device can provide test run details. These results may be structured in embodiments to facilitate perusing and analysis of the results in order to find the needed details.

Embodiments are directed to text input the end user can use to add information about the context of the report or the reason the report was initiated. This text is embedded in an associated report and is available to network administrators and support contacts. This text is arbitrary and can form the basis for company policies to capture other information such as what applications were in use, what work assignments were being pursued and/or what device actions were being attempted before the diagnostic tests were initiated.

As administrators of the network, especially in a mobile wireless network, are rarely present when an end user encounters problems, embodiments are directed to a system and method that provide a thorough examination of a device's condition at the time the problem manifest and is therefore much more likely to capture pertinent data than any troubleshooting done after. This immediacy is often important when troubleshooting issues that are intermittent.

Since it is common for a support contact to be provided to the end user, embodiments are directed to a system and method that enables end users to receive help remotely, including over the phone, by presenting the results in increasing complexity. The end user can simply read the "probable root cause" to the support contact. The support contact then guides the end user through the present invention's report, asking the end user to read the details pertinent to the issue. The support person thus gains the details necessary to troubleshoot even when the issues are so severe that the device has no network connection.

In embodiments in which the device has connectivity, the report is sent to the server, where it is processed and available for presentation in short order, e.g., in under five minutes. A support contact helping an end user under these conditions will have access to a depth of pertinent information about the end user's device and the device's network conditions, often within a time frame that allows for help while the end user is still experiencing the issue. The support contact can export the report to other tools, such as a text editor, to allow for easy searching and capturing of the data they find important.

Many networked devices and their resident applications take advantage of the availability of multiple networks. This is especially true in a mobile situation where the networked device can connect with multiple cellular networks (GSM and CDMA) as well as potentially dozens of Wi-Fi access points in a given location. The present invention incorporates these possibilities into its tests in support of this modern situation. For example, a support contact will see, in the details of a report, which available network is in use and can determine if it is appropriate or potentially an issue.

In embodiments, all reports are aggregated to or in a server, which allows the network administrator access to the details of all the reports generated within their system.

According to embodiments, the network administrator can filter and sort all reports based on many factors including, e.g., time, device type, wireless network used, phone number, issue severity, and probable root cause. This allows a network administer to focus on emergent and severe issues. For example, a network administrator could see that several devices are reporting a certain network resource (such as a file sharing system) is unreachable. The network administrator can then address the problem even before any of the end users call to report it.

Almost every organization that requires network connectivity has one or more networked services they depend upon. A healthcare company may need access to a file sharing server. Police may need access to a dispatch system for auxiliary data. A sales team may need to access an inventory system. Embodiments provides for the defining of custom tests for the purpose of diagnosing issues with networked resources. This customization is set up by the network administrator and allows the troubleshooting of an issue down to the resources a particular organization relies upon.

Not every end user has time to initiate a diagnostic test. For instance, a baggage handler at a busy airport does not have time to interact with anything except the applications necessary to get the job done. To help in this circumstance, embodiments are directed to a system and method that allows for the defining of conditions under which diagnostic tests will be automatically executed and a report generated and sent to the server. For example, a network administrator can set the present invention to initiate a diagnostic test when the device reports itself unable to connect for a certain period of time.

Embodiments are directed to a method for diagnosing the state of a device connected to one or more computer networks. The method can include gathering and analyzing a status and configuration of every computer network interface available on a device, gathering and analyzing the network configuration information on a device, and, if available, gathering of GPS configurations, status, and data. The method can also include testing of network connectivity for the device using a preset server as a control.

In accordance with embodiments, the method can further include executing one or more customized network connectivity tests and testing of network connectivity for the device to arbitrary networked resources.

According to embodiments, the data collected in gathering and analyzing the network configuration information on the device includes determining the default interface.

In other embodiments, the data collected in gathering and analyzing the network configuration information on the device includes determining a default interface for an active VPN. For supported VPNs, this test will fail if the VPN is utilizing an interface whose test failed. The test will produce a warning if the VPN is disconnected or whose interface test produced a warning or if the VPN is utilizing an interface that is slower than another available interface.

According to still other embodiments, the data collected in gathering and analyzing the status and configuration of every computer network interface available on the device includes a list of all computer network interfaces available and their most important settings, which include: The interface's human-readable interface name; the interface's network address (IP address); the interface's internal reference code or index; the interface's technology type; and/or the interface's current signal strength (for wireless networks);

In embodiments, if an issue is found, the method can further include using the data collected to determine the most likely root cause of the issue. The tests are ordered such that the most likely root cause will be the first most penitent issue found among all the tests. In case of multiple tests not passing, the pertinent issue of the first failed test will be considered the likely root cause, otherwise it will be the pertinent issue of the first test returning a warning (detection of an abnormality that does not break connectivity).

According to embodiments, if an issue is found, the data collected in the gathering and analyzing a status and configuration of every computer network interface available on the device, and gathering and analyzing the network configuration information on the device is used in summarizing a most pertinent issue. For all interfaces, this test will fail if no interfaces are found; if no interfaces have a valid network address (IP address), if no interfaces have a default gateway; if no interface can be found with both a valid network address and default gateway; or if the interface currently in use failed its test. For WWAN (cellular) networks the test will fail if the network interface is disconnected or is otherwise in an unknown state; if no service is available over the WWAN network interface, or if no signal is detected over the WWAN network interface. This test will produce a warning if the WWAN network interface is connected over an older cellular technology (2G or worse) or if the WWAN network signal is very weak. Because WWAN network interfaces are generally optional, this test will pass if no WWAN network interface is detected. For WiFI networks, this test will fail if no WiFi adapter is detected. It will produce a warning if the WiFi signal quality is weak.

In accordance with still other embodiments, if an issue is found, the data collected in the testing of network connectivity for the device using a preset server as a control is used in summarizing a most pertinent issue.

In still other embodiments, if an issue is found for a particular test, the data collected in the executing one or more customized network connectivity tests is used to summarize the most pertinent issue.

In accordance with still other embodiments, the data collected in the gathering and analyzing a status and configuration of every computer network interface available on the device contains detailed information on all computer network interfaces available, which may include:

a. the interface's status encompassing readiness;
b. the interface's human-readable interface name;
c. the interface's network address (IP address);
d. the interface's network scope (mask);
e. the interface's external contact address (gateway);
f. the interface's internal reference code or index;
g. the interface's technology type;
h. the interface's current signal strength (for wireless networks);
i. the interface's DHCP settings;
j. if/when appropriate, the interface's Wi-Fi state;
k. if/when appropriate, the interface's Wi-Fi radio count;
l. if/when appropriate, the interface's Wi-Fi radio state for each radio;
m. if/when appropriate, the interface's Wi-Fi profile;
n. if/when appropriate, the interface's Wi-Fi connect mode;
o. if/when appropriate, the interface's Wi-Fi BSSID;
p. if/when appropriate, the interface's Wi-Fi SSID;
q. if/when appropriate, the interface's Wi-Fi type;
r. if/when appropriate, the interface's Wi-Fi RSSI;
s. if/when appropriate, the interface's Wi-Fi reception rate;
t. if/when appropriate, the interface's Wi-Fi transmission rate;

u. if/when appropriate, the interface's Wi-Fi security status;
v. if/when appropriate, the interface's Wi-Fi technology generation;
w. if/when appropriate, the interface's Wi-Fi physical index;
x. the interface's physical status;
y. the interface's administrative status;
z. the interface's hardware address (MAC);
aa. the interface's permanent hardware address (permanent MAC);
bb. the interface's NDIS type;
cc. the interface's transmit link speed;
dd. the interface's receive link speed;
ee. the interface's count of incoming data octets;
ff. the interface's count of incoming unicast packets;
gg. the interface's count of incoming multicast packets;
hh. the interface's count of incoming discarded packets;
ii. the interface's count of errors processing incoming packets;
jj. the interface's count of incoming unknown protocol requests;
kk. the interface's count of incoming unicast data octets;
ll. the interface's count of incoming multicast data octets;
mm. the interface's count of incoming broadcast octets;
nn. the interface's count of outgoing data octets;
oo. the interface's count of outgoing unicast packets;
pp. the interface's count of outgoing multicast packets;
qq. the interface's count of outgoing discarded packets;
rr. the interface's count of errors processing outgoing packets;
ss. the interface's count of outgoing unicast data octets;
tt. the interface's count of outgoing multicast data octets;
uu. the interface's count of outgoing broadcast octets;
vv. if/when appropriate, all Wi-Fi networks detected by this interface, which can include the security state, signal strength, and availability of each;
ww. All manufacturer hardware ID's associated with the interface;
xx. if/when appropriate, the WWAN (cellular) manufacturer;
yy. if/when appropriate, the WWAN (cellular) model;
zz. if/when appropriate, the WWAN (cellular) hardware version;
aaa. if/when appropriate, the WWAN (cellular) firmware version;
bbb. if/when appropriate, the WWAN (cellular) phone number;
ccc. if/when appropriate, the WWAN (cellular) connection status;
ddd. if/when appropriate, the WWAN (cellular) technology;
eee. if/when appropriate, the WWAN (cellular) signal strength;
fff. if/when appropriate, the WWAN (cellular) operational status;
ggg. if/when appropriate, the WWAN (cellular) administrative status;

According to embodiments, the data collected in the gathering and analyzing the network configuration information on the device includes the current network routine table, which, for each route defined, can include:
a. the route's destination address (IP address);
b. the route's network scope (mask);
c. the route's external contact address (next hop);
d. the interface internal code or index for the interface associated with the route;
e. the route's age;
f. the route's policy;
g. the route's protocol;
h. the route's type;

In accordance with other embodiments, the data collected in the gathering of GPS configurations, status, and data can include:
a. the GPS availability status;
b. the GPS port name on the device;
c. the GPS human-readable name;
d. the GPS manufacturer;
e. the GPS model;
f. the GPS communications speed;
g. the GPS fix status;
h. the GPS time of most recent fix;
i. the GPS latitude and longitude;
j. the GPS HDOP or accuracy in meters;
k. if/when appropriate, providing a sample of the GPS' recent NMEA data stream;

According to other embodiments, the data collected in the testing of network connectivity for the device using the preset server as a control may include detecting a captive portal (or Wi-Fi hotspot). Results of this detection may include:
a. if/when no issues are detected, collecting a summary indicating that communication is not blocked by a captive portal;
b. if/when issues are detected, collecting a summary of the most pertinent issue;
c. collecting the URL of the Internet test server;
d. collecting the network address (IP address) of the internet test server;
e. collecting the actual network address (IP address) received through DNS;
f. collecting the HTTP return code;
g. collecting a sample of HTTP headers returned;
h. collecting the first 512 bytes of data returned;
This test will fail if data was returned but the expected text is missing. This test will note if the data could not be loaded as this situation makes the test result indeterminate.

In embodiments, the data collected in the testing of network connectivity for the device using the preset server as the control includes determining the existence and status of a VPN (if supported). Results of this determination can include:
a. whether a supported VPN exists on the device;
b. if/when appropriate, producing a summary indicating that communication over the VPN is working;
c. if/when appropriate, producing a summary of the most pertinent issue;
d. if/when appropriate, collecting the connection status of the VPN;
e. if/when appropriate, determining whether the VPN is in use;
f. if/when appropriate, collecting the user ID associated with the current VPN connection.
This test will fail if the supported VPN is disabled or if the VPN is unable to communicate with its servers. This test will issue a warning if the supported VPN is not loaded, is disconnected, or is idle despite the traffic of the test.

In accordance with embodiments, the data collected in the testing of network connectivity for the device using the preset server as the control includes an Internet connectivity test using an Internet test server as a control. Results may include:
a. if/when issues are detected, producing a summary of the most pertinent issue;

b. collecting the results of resolving the host name for the Internet test server;

c. collecting the results of a single ICMP ping of the Internet test server;

d. collecting the results of a page load (HTML Get) from the Internet test server;

e. collecting the configuration for a full ping test of the Internet test server including the Internet test server's network address (IP address), target ping count, overall test timeout setting, and single ICPM ping timeout setting;

f. collecting results from each of the individual ICMP pings attempted;

g. collecting a summary of the ping test results, which can include name resolution result, number of pings actually attempted, number actually received, the minimum round trip time, the maximum round trip time, and the average round trip time;

h. if/when the ping test fails, collecting the configuration for a trace route check, which can include the target host, the number of ICMP pings per route hop, the maximum number of route hops to trace, single ICMP ping timeout setting, and overall test timeout setting;

i. if/when the ping test fails, collecting the results of each hop check executed by the trace route check, which can include the hop number, the round trip time for each of the ICMP pings performed, and the name (or IP address) of the responding machine.

The page load test will fail if resolving the test server name failed; if the test server is unreachable; or if the test server returned an error. The ping test will fail if no ICMP pings succeeded. The ping test will issue a warning if more than one ICMP ping failed or if the average round trip time was greater than one second.

Further, the data collected in the executing of one or more customized network connectivity tests may include collecting one or more copies of the data collected above, but the test(s) target server(s) are configured by a server administrator instead of the Internet test server.

Still further, the data collected in the executing of one or more customized network connectivity tests may include collecting one or more copies of the data collected in the:

b. collecting of the results of resolving the host name for the Internet test server;

c. collecting the results of a single ICMP ping of the Internet test server; and d. collecting the results of a page load (HTML Get) from the Internet test server, but the test(s) target server(s) are configured by a server administrator instead of using the Internet test server.

The data collected in the executing of one or more customized network connectivity tests may include collecting one or more copies of the data collected in the:

e. collecting of the configuration for a full ping test of the Internet test server including the Internet test server's network address (IP address), target ping count, overall test timeout setting, and single ICPM ping timeout setting;

f. collecting of results from each of the individual ICMP pings attempted; and g. collecting of a summary of the ping test results, which can include name resolution result, number of pings actually attempted, number actually received, minimum round trip time, the maximum round trip time, and the average round trip time, but the test(s) target server(s) are configured by a server administrator instead of using the Internet test server.

Moreover, the data collected in the executing of one or more customized network connectivity tests may include collecting one or more copies of the data collected in the h. collecting the configuration for a trace route check, if/when the ping test fails, which can include the target host, the number of ICMP pings per route hop, the maximum number of route hops to trace, single ICMP ping timeout setting, and overall test timeout setting; and i. collecting the results of each hop check executed by the trace route check, if/when the ping test fails, which can include the hop number, the round trip time for each of the ICMP pings performed, and the name (or IP address) of the responding machine, but the test(s) target server(s) are configured by a server administrator instead of using the Internet test server.

According to further embodiments, the data collected in the executing of one or more customized network connectivity tests may include collecting one or more copies of the data by performing a TCP/IP bind to one or more port and server combinations configured by a server administrator. Results can include:

a. if/when issues are detected, collecting a summary of the most pertinent issue;

b. collecting the name of the configured server;

c. collecting the port configured;

d. collecting the network address (IP address) of the configured server;

e. collecting the local socket selected for the bind, which includes the device's network address (IP address) and local port The TCP/IP bind test will fail if either the binding of the port, or the attempt to connect, fail.

According to other embodiments, the data collected in the executing of one or more customized network connectivity tests may include collecting one or more copies of the data by performing a name resolution test on one or more server(s) configured by a server administrator. Results may include:

a. if/when issues are detected, collecting a summary of the most pertinent issue;

b. collecting the name of the configured server;

c. collecting the result of the DNS lookup;

d. collecting the network address (IP address) from the DNS lookup,

The name resolution test will fail if the host name does not resolve to a network address (IP address)

In accordance with still other embodiments, the method includes entering arbitrary text, e.g., by a user or in an automated manner, and attaching the text with results.

In other embodiments, the method can further include generating a human readable report based on the results, which can include:

a. if/when an issue is detected, the most likely cause is indicated;

b. the findings of each test is summarized;

c. the state of each test is clearly indicated;

d. the detailed information from every test is made available;

In accordance with embodiments, the format of the report, as displayed to the end user, facilitates phone-based support by clearly reporting: the likely cause, each pertinent issue, each test's status, and details. Further, the format of the report, as displayed to the system administrator, can facilitate common understanding with the end user by maintaining the same format, terminology, and available information from the method.

According to still other embodiments, the method can include the use of a consistent Internet test server for the testing of network connectivity for the device using the preset server as the control 1 to form a basis of comparison of results for most of the customized tests from the executing of one or more customized network connectivity tests.

In accordance with other embodiments, the method may include system administrators defining customized tests for networked resources important to their organization, having them executed as part of the executing of one or more customized network connectivity tests, and including the results as part of an overall report. The customized tests defined by the system administrator may be automatically distributed to all networked devices associated with the central server.

In further embodiments, the method can allow end users to initiate a manual execution of the tests under any networking conditions. In this manner, the method allows execution to be initiated independent of network status, and can be parameterized to suppress some or all user feedback.

Moreover, the method can allow the automated execution of tests based on the device's network conditions or other events. The method can allow automated execution to be parameterized to balance frequency with system impact.

In other embodiments, the method can include transmitting reports from networked devices to a central server. The method accounts for possible intermittent network conditions by storing reports when the central server is unreachable and attempting retransmission on a periodic, random basis to minimize network flooding.

According to other embodiments, the method may include adding a map location, when available, to the display of a report.

In still other embodiments, the method can include displaying, sorting, and filtering of reports on the central server by the network administrator. The method can allow network administrators to reduce the set of reports to the subset of interest for the task at hand.

In accordance with still other embodiments of the present invention, the method can allow for creation of alerts in the form of SMS or emails sent to defined parties. The method may allow for alerts filtered for report severity and sent at various time intervals.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
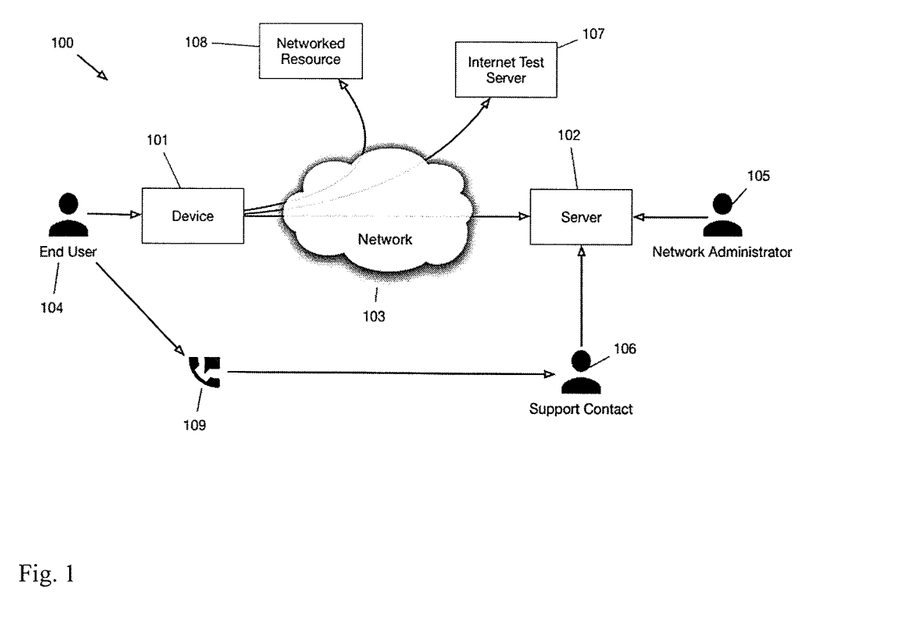
FIG. 1 is a diagram representing a simplified view of the present invention with indications of interaction.

FIG. 1 shows the present invention in the most simplified context 100 with a networked device 101 communicating through a network 103 to the central server 102. Of course, it is to be understood that, in practice, there can be many thousand networked devices 101 communicating to a single central server 102. Network 103 can be any arbitrary computer network that utilizes the internet protocol stack, but in practice is usually connected to the Internet. The human actors pictured are the device's end user 104 who interacts with a support contact 106 through a phone or other electronic devices 109. Support contact 106 may use central server 102 to review a latest report from networked device 101 or other related previous results. Moreover, a network administrator 105, who, e.g., administers central server 102 and uses central server 102 to configure custom tests and to analyze test results. During the running of a diagnostic test, networked device 101 will attempt to contact an Internet test server 107, which is an established, always-available server that acts as a control. Networked resource 108 is an example target of a custom test configured by network administrator 105. In practice, there can be several custom tests targeting a number of networked resources 108.

Figure 2:
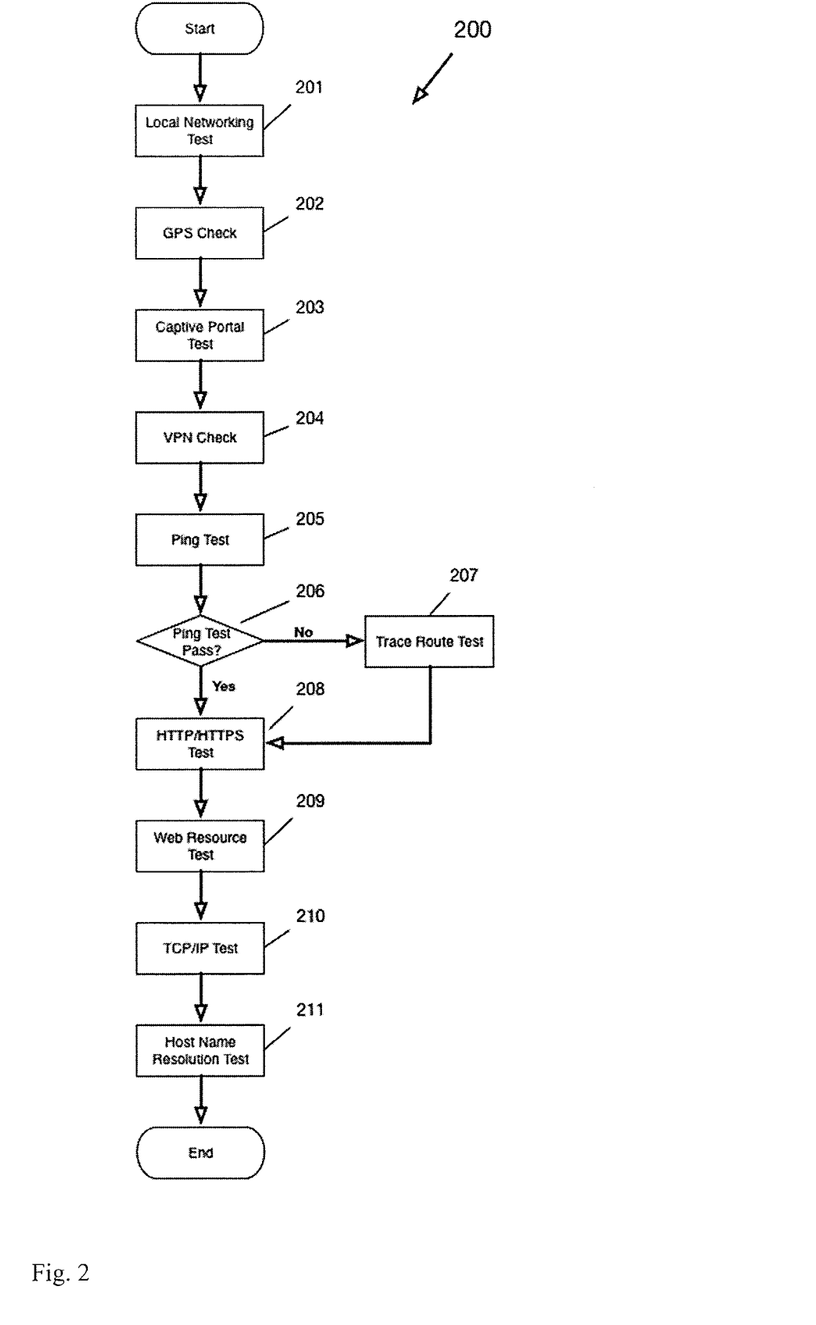
FIG. 2 illustrates a flow diagram of the present invention's overall diagnostic logic including potential custom tests.

FIG. 2 presents an exemplary a sequence of logic 200 for an exemplary diagnostic run as a flow chart. The sequence of logic 200 is an exemplary method for optimizing the determination of the root cause of a potential connection issue. The sequence of logic 200 starts with tests local to the networked device 101, e.g., local networking test 201, GPS check 202, captive portal test 203, and virtual private network (VPN) test 204. After finishing the local tests, the sequence of logic 200 then executes tests for network connectivity to the Internet test server 107, e.g., ping test 205, trace route check 207, and HTTP/HTTPS test 208. The trace route check 207 can be somewhat slow, e.g., taking up to several seconds to execute. Therefore, the status of ping test 205 is checked at 206 and trace route check 207 is executed, if the ping test 205 does not pass. Otherwise, the sequence of logic 200 proceeds directly to custom tests as defined by a network administrator 106. Possible custom tests include, e.g., web resource test 209, TCP/IP test 210, and host name resolution test 211, plus customized instances of ping test 205, trace route check 207, and HTTP/HTTPS test 208.

Figure 3:
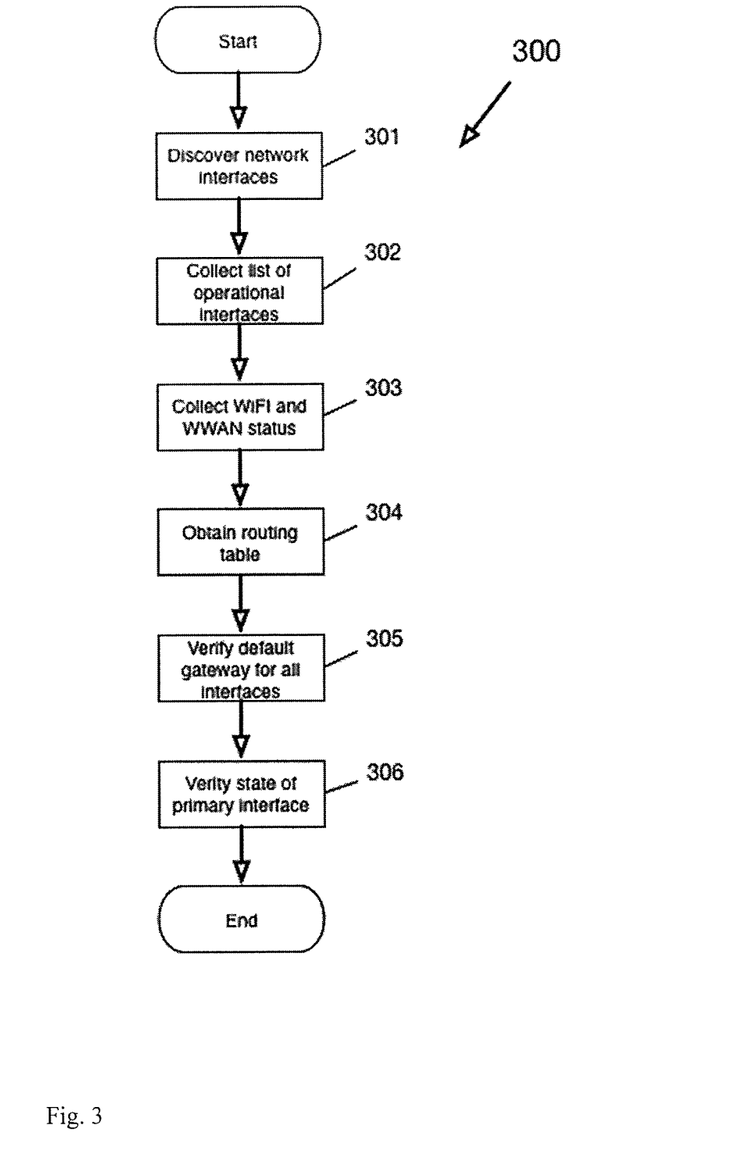
FIG. 3 illustrates a flow diagram of the present invention's local network conditions diagnostic logic.

FIG. 3 presents an exemplary the sequence of logic 300 for the local networking test 201. The local networking test 201 is a diagnostic test that examines the state of the local networking interfaces and attempts to determine issues effecting connectivity to the network 103 that are generally actionable on networked device 101. These tests produce no external network activity and are very fast queries of networked device 101. According to the exemplary embodiment, discover network interfaces 301, uses device-specific APIs to enumerate all the available modules and/or elements of network communication, including cellular networks and Wi-Fi adapters, on the networked device 101. Next, collect list of operational interfaces 302 determines which discovered network interfaces are fully functional and able to send and receive data. Then collect Wi-Fi and WWAN status 303 gathers detailed information about the Wi-Fi and WWAN (cellular network) interfaces. Obtain routing table 304 gathers from networked device 101 the local information the device uses to direct (route) traffic to networked resources 108. Then, verify default gateway for all interfaces 305 obtains and validates that each operational interface is configured with a networked resource 108 that serves as its initial contact for network communications. Finally, verify state of primary interface 306 discovers which interface is being used by default for network communications and determines if it is operational.

Figure 4:
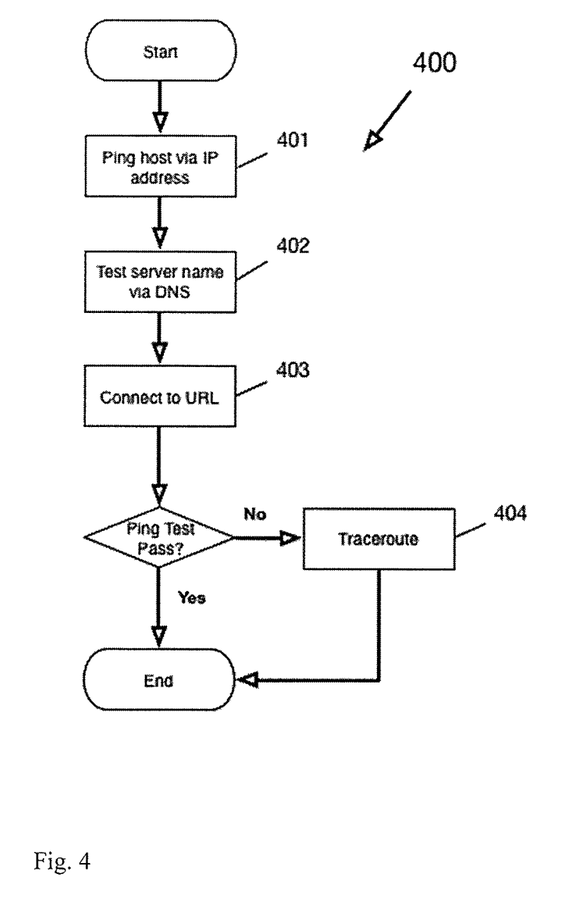
FIG. 4 illustrates a flow diagram of the present invention's web resource customizable

FIG. 4 presents an exemplary sequence of logic 400 for web resource test 209 as a flow chart. Web resource test 209 is a convenient conglomeration of other tests that can be customized by network administrator 105. When customizing web resource test 209, network administrator 105 specifies the DNS name and IP address of a networked resource 108. Using those as parameters, web resource test 209 runs a ping host via IP address 401, which is the same as ping test 205, except for using the IP address supplied by network administrator 105. Test server name via DNS test 402 is part of HTTP/HTTPS test 208. Test server name via DNS test 402 uses the Internet DNS system to verify the DNS name supplied by network administrator 105 is valid and its IP address matches the IP address supplied by network administrator 105. Connect to URL test 403 also borrows from HTTP/HTTPS test 208 by doing a combination of a HTTPS get followed by a HTTPS get to verify networked resource 108 specified by network administrator 105 returns successfully. As with the complete diagnostic tests 200, if the ping host via IP address test 401 fails, trace route check 404 is performed.

Local networking test 201 executes discover network interfaces 301 which, using APIs specific for the operating system of networked device 101, catalogs all available modules, devices and/or elements through which networked device 101 can communicate over a network 103. This includes cellular networks (such as CDMA and GSM) and wireless local area networks (known as Wi-Fi). Details of all discovered interfaces are included in the report that is displayed to end user 104 and sent to central server 102. These details include, but are not limited to, the interface's status, network address, network gateway, Wi-Fi make and model, current Wi-Fi state, current Wi-Fi signal strength, all current Wi-Fi networks detected, WWAN make and model, current WWAN state, current WWAN signal strength, current WWAN technology type, WWAN carrier, MAC address, transmit and receive speeds, and byte sent and bytes received.

The complete diagnostic run 200 includes GPS check 202, which, if the device has an accessible GPS unit, reports the GPS coordinates of networked device 101. In addition, GPS check 202 gathers other data such as, but not limited to, the GPS unit type, port name, status, HDOP or meter-tolerance, and number of satellites plus, if appropriate for the GPS unit, a recent sample of the constant flow of data from the GPS unit known as the NMEA stream.

The complete diagnostic run 200 includes captive portal test 202, which tests if the Wi-Fi network being utilized passes through a router that is trapping all traffic, usually for the purpose of forcing a login. Captive portal test 202 will fail if a Wi-Fi access point is blocking access to the Internet. This is an important test as Wi-Fi interfaces can be set to spontaneously connect to an available network 103, thus blocking networked device 101 from accessing needed networked resources 108.

The complete diagnostic run 200 includes VPN test 204, which checks for the presence and condition of supported VPNs. VPN test 204 reports the current condition, gives an informational message if no supported VPN is installed, warns if the supported VPN is disconnected, and will fail if the supported VPN is disabled or unreachable.

The complete diagnostic run 200 includes ping test 205, which executes 20 standard Internet ICMP Pings to the Internet test server 107. Ping test 205 sets a timeout on each ICMP ping of 2 seconds. Ping test 205 limits the entire test to 20 seconds in case the Internet test server 107 is unreachable. Since ICMP pings are not guaranteed, ping test 205 warns if more than one ICMP ping failed or if the average time to complete each ICMP ping is more than one second.

In embodiments, the complete diagnostics run 200 can include trace route check 207. Trace route check 207 can be slow, often taking several seconds. Because of this, it is preferable that trace route check 207 is executed if/when ping test 205 fails. Trace route check 207 is informational only—providing extra report details but does not pass or fail. Trace route check 207 steps through the path the ICMP ping attempted during ping test 205 by sending an ICMP ping to each network hop needed to reach Internet test server 107. For each hop, trace route check 207 records, e.g., a hop number, IP address, and response time among other information. If the check ends due to an error or timeout, trace route check 207 includes this at the bottom of the details.

The complete diagnostics run 200 includes HTTP/HTTPS test 208 as its final built-in test. In the exemplary embodiments, HTTP/HTTPS test 208 will pass if Internet test server 107 returns either a 200-level HTTP response or a 401 (basic authentication required) response, otherwise it fails. The details of HTTP/HTTPS test 208 include, but are not limited to, the HTTP response code, OS-specific error status, overall duration of the test, and the bytes returned in the server response.

Other than web resource test 209, the complete diagnostics run 200 can be customized by network administrator 105, e.g., by adding a number of other tests. These can include, e.g., tests that constitute web resource test 209: ping host via IP address test 401, test server name via DNS test 402, connect to URL test 403, and trace route check 404. In addition to these, complete diagnostics run 200 can be customized by a network administrator 105 by adding, e.g., TCP/IP test 210 and host name resolution test 211. TCP/IP test 210 attempts a bind to a port and socket of a networked resource 108. TCP/IP test 210 attempts the bind using a port number and DNS name (or IP address) supplied by network administrator 105. Host name resolution test 211 simply checks that the DNS name supplied by the network administrator 105 is in the DNS.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described may be implemented for operation as executable modules or as executable software programs running on a computer processor. Dedicated hardware implementations including, but not limited to, application specific integrated circuits, programmable logic arrays and other hardware devices and/or modules can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software implementations of the present invention as described herein may be optionally stored on a tangible, non-transitory storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission and wireless networking represent examples of the state of the art. Such standards are periodically superseded by faster or more efficient equivalents having essentially the same functions. Accordingly, replacement standards and protocols having the same functions are considered equivalents.

It is noted that the foregoing examples have been provided merely for the purpose of explanation and are in no way to be construed as limiting of the present invention. While the present invention has been described with reference to an exemplary embodiment, it is understood that the words, which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for diagnosing a state of a device connected to one or more computer networks, the method comprising:
   a. gathering and analyzing a status and configuration of every available computer network interface on the device;
   b. gathering and analyzing a network configuration information on the device;
   c. gathering GPS configurations, status, and data;
   d. testing network connectivity for the device using a preset server as a control; and
   e. executing one or more customized network connectivity tests.

2. The method of claim 1, wherein the network configuration information includes determining a default interface.

3. The method of claim 1, wherein the network configuration information includes determining a default interface for the active VPN.

4. The method of claim 1, wherein, from the gathered configuration of every available computer network interface, a list of all available computer network interfaces and a most important setting for each of the listed available computer network interface is produced, and
   wherein the most important setting includes one of:
   a. a human-readable interface name;
   b. a network IP address;
   c. an internal reference code or index;
   d. a technology type; or
   e. a current signal strength (for wireless networks).

5. The method of claim 1, wherein, when a connectivity issue is found, gathered data of the status and configuration of every available computer network interface on the device, the network configuration information on the device, and the GPS configurations, status, and data are used to determine a most likely root cause of the issue.

6. The method of claim 1, wherein when a connectivity issue is found, gathered data of the status and configuration of every available computer network interface on the device, and the network configuration information on the device are used to summarize a most pertinent issue.

7. The method of claim 1, wherein, when a connectivity issue is found, data from the testing of network connectivity using the preset server as a control is used to summarize a most pertinent issue.

8. The method of claim 1, wherein, when a connectivity issue is found, data from the one or more executed customized network connectivity tests is used to summarize a most pertinent issue.

9. The method of claim 1, wherein data related to the gathering and analyzing of the status and configuration of every available computer network interface available on the device includes at least one of:
   a. status encompassing readiness of every available interface;
   b. human-readable interface name of every available interface;
   c. network IP address of every available interface;
   d. network scope (mask) of every available interface;
   e. external contact address (gateway) of every available interface;
   f. internal reference code or index of every available interface;
   g. technology type of every available interface;
   h. current signal strength (for wireless networks) of every available interface;
   i. DHCP settings of every available interface;
   j. Wi-Fi state of every available interface;
   k. Wi-Fi radio count of every available interface;
   l. Wi-Fi radio state for each radio of every available interface;
   m. Wi-Fi profile of every available interface;
   n. Wi-Fi connect mode of every available interface;
   o. Wi-Fi BSSID of every available interface;
   P. Wi-Fi SSID of every available interface;
   q. Wi-Fi type of every available interface;
   r. Wi-Fi RSSI of every available interface;
   s. Wi-Fi reception rate of every available interface;
   t. Wi-Fi transmission rate of every available interface;
   u. Wi-Fi security status of every available interface;

v. Wi-Fi technology generation of every available interface;
w. Wi-Fi physical index of every available interface;
x. physical status of every available interface;
y. administrative status of every available interface;
z. hardware MAC address of every available interface;
aa. permanent MAC hardware address of every available interface;
bb. NDIS type of every available interface;
cc. transmit link speed of every available interface;
dd. receive link speed of every available interface;
ee. count of incoming data octets of every available interface
ff. count of incoming unicast packets of every available interface;
gg. count of incoming multicast packets of every available interface;
hh. count of incoming discarded packets of every available interface;
ii. count of errors processing incoming packets of every available interface;
jj. count of incoming unknown protocol requests of every available interface;
kk. count of incoming unicast data octets of every available interface;
ll. count of incoming multicast data octets of every available interface;
mm. count of incoming broadcast octets of every available interface;
nn. count of outgoing data octets of every available interface;
oo. count of outgoing unicast packets of every available interface;
pp. count of outgoing multicast packets of every available interface;
qq. count of outgoing discarded packets of every available interface;
rr. count of errors processing outgoing packets of every available interface;
ss. count of outgoing unicast data octets of every available interface;
tt. count of outgoing multicast data octets of every available interface;
uu. count of outgoing broadcast octets of every available interface;
vv. the security state, signal strength, and availability of each Wi-Fi network detected by every available interface;
ww. All manufacturer hardware ID's associated with every interface;
xx. a cellular WWAN manufacturer;
yy. a cellular WWAN model;
zz. a cellular WWAN hardware version;
aaa. a cellular WWAN firmware version;
bbb. a cellular WWAN phone number;
ccc. a cellular WWAN connection status;
ddd. a cellular WWAN technology;
eee. a cellular WWAN signal strength;
fff. a cellular WWAN operational status; and
ggg. a cellular WWAN administrative status.

10. The method of claim 1, wherein data related to gathering and analyzing the network configuration information on the device includes a current network routing table which, for each route defined, includes at least one of:
a. destination IP address;
b. network scope (mask);
c. external contact address (next hop);
d. an internal code or index for an interface associated with the defined route;
e. age;
f. policy;
g. protocol; and
h. route type.

11. The method of claim 1, wherein data related to the gathering of GPS configurations, status, and data includes at least one of:
a. GPS availability status;
b. GPS port name on the device;
c. GPS human-readable name;
d. GPS manufacturer;
e. GPS model;
f. GPS communications speed;
g. GPS fix status;
h. GPS time of most recent fix;
i. GPS latitude and longitude;
j. GPS HDOP or accuracy in meters; and
k. a sample of a GPS' recent NMEA data stream.

12. The method of claim 1, wherein the testing of the network connectivity using the preset server includes detection of one of a captive portal or a Wi-Fi hotspot and data related to the testing of the network connectivity includes at least one of:
a. a summary indicating that communication is not blocked by a captive portal;
b. a summary of a most pertinent issue identified;
c. a URL of the internet test server;
d. a network IP address of the internet test server;
e. an actual network IP address received through DNS;
f. a HTTP return code;
g. a sample of HTTP headers returned; and
h. a first 512 bytes of data returned.

13. The method of claim 1, wherein the testing of the network connectivity using the preset server includes determining an existence and status of a VPN, and data related to the testing of the network connectivity includes at least one of:
a. whether an existing VPN is supported;
b. a summary indicating that communication over the VPN is working;
c. a summary of a most pertinent issue;
d. a connection status of the VPN;
e. whether the determined VPN is in use; and
f. a user ID associated with a current VPN connection.

14. The method of claim 1, wherein the testing of the network connectivity using the preset server includes an internet connectivity test using an internet test server as a control, and data related to the testing of the network connectivity includes at least one of:
a. a summary of a most pertinent detected issue;
b. results of resolving a host name for the internet test server;
c. results of a single ICMP ping of the internet test server;
d. results of a page load (HTML Get) from the internet test server;
e. a configuration for a full ping test of the internet test server including a network IP address for the internet test server, target ping count, overall test timeout setting, and single ICMP ping timeout setting;
f. results from each individual attempted ICMP ping;
g. a summary of ping test results including name resolution result, number of pings actually attempted, number actually received, minimum round trip time, maximum round trip time, and average round trip time;

h. a configuration for a trace route check for a failed ping test including a target host, number of ICMP pings per route hop, maximum number of route hops to trace, single ICMP ping timeout setting, and overall test timeout setting; and i. a result of each hop check executed by the trace route check for a failed ping test including hop number, round trip time for each of the ICMP pings performed, and one of a name or IP address of a responding machine.

15. The method of claim 14, wherein the internet test server comprises at least one test target server configured by a server administrator, wherein data collected in the execution of one or more customized network connectivity tests may include one or more copies of the data collected.

16. The method of claim 14, wherein the internet test server comprises at least one test target server configured by a server administrator, wherein data collected in the executing of the one or more customized network connectivity tests include one or more copies of data related to the results of resolving the host name for the internet test server, the results of a single ICMP ping of the internet test server, and the results of a page load (HTML Get) from the internet test server.

17. The method of claim 14, wherein the internet test server comprises at least one test target server configured by a server administrator, wherein data collected in the executing of the one or more customized network connectivity tests include one or more copies of data related to the configuration for the full ping test of the internet test server, the results from each individual attempted ICMP ping, and the summary of the ping test results.

18. The method of claim 14, wherein the internet test server comprises at least one test target server configured by a server administrator, wherein data collected in the executing of the one or more customized network connectivity tests include one or more copies of data related to the configuration for a trace route check for a failed ping test and the result of each hop check executed by the trace route check for a failed ping test.

19. The method of claim 1, wherein the preset server comprises at least one server configured by a system administrator, and wherein the executed customized network connectivity tests comprise a TCP/IP bind to one or more port and server combinations configured by a server administrator, and data related to results of the executed connectivity tests include at least one of:

a. a summary of a most pertinent issue;

b. a name of the configured at least one server;

c. a port configured;

d. a network IP address of the configured at least one server; and e. a local socket selected for the bind, which is the device's network IP address and local port.

20. The method of claim 1, wherein the preset server comprises at least one server configured by a system administrator, and wherein the executed customized network connectivity tests comprise a name resolution test on one or more server(s) configured by a server administrator, and data related to results of the executed connectivity tests include at least one of:

a. a summary of a most pertinent issue;

b. a name of the configured at least one server;

c. a result of a DNS lookup; and d. a network IP address from a DNS lookup.

* * * * *